(12) United States Patent
Vollmer et al.

(10) Patent No.: US 6,205,035 B1
(45) Date of Patent: Mar. 20, 2001

(54) BIDIRECTIONAL DC/DC CONVERTER WITH A STEP-UP MODE IN ONE DIRECTION AND A STEP-DOWN MODE IN THE OTHER DIRECTION

(75) Inventors: Ludwig Vollmer, Anröchte; Andreas Schell, Stuttgart; Helmut Lorenz, Oberboihingen, all of (DE)

(73) Assignees: Ascom Energy Systems AG, Bern (CH); DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/348,158

(22) Filed: Jul. 6, 1999

(30) Foreign Application Priority Data

Jul. 3, 1998 (DE) .............................. 198 29 777

(51) Int. Cl.$^7$ .................................................. H02M 3/335
(52) U.S. Cl. ................................................. 363/17; 363/24
(58) Field of Search .................................. 363/17, 24, 25, 363/26

(56) References Cited

U.S. PATENT DOCUMENTS

| 3,986,097 | 10/1976 | Woods | 307/64 |
|---|---|---|---|
| 4,953,068 | * 8/1990 | Henze | 363/17 |
| 5,140,509 | * 8/1992 | Murugan | 363/24 |
| 5,181,169 | * 1/1993 | Murugan | 363/26 |
| 5,255,174 | * 10/1993 | Murugan | 363/17 |
| 5,381,327 | * 1/1995 | Yan | 363/24 |
| 5,903,448 | * 5/1999 | Davila | 363/25 |
| 5,930,134 | * 7/1999 | Glennon | 363/26 |
| 6,021,052 | * 2/2000 | Unger et al. | 363/26 |

FOREIGN PATENT DOCUMENTS 195 42 357 A1   4/1999 (DE) .............................. H02M/3/337

* cited by examiner

Primary Examiner—Jeffrey Sterrett
(74) Attorney, Agent, or Firm—Herbert L. Lerner; Laurence A. Greenberg; Werner H. Stemer

(57) ABSTRACT

A DC/DC converter which can be operated alternately as a step-up converter in a first direction of energy flow and as a step-down converter in a second direction of energy flow is disclosed. Potential isolation between the low-voltage side and the high-voltage side of the converter is achieved by a magnetic compound unit, which has not only a transformer function but also an energy store function. The converter operates as a push-pull converter in both directions of energy flow. The DC/DC converter can be used for example in motor vehicles with an electric drive fed by fuel cells.

12 Claims, 5 Drawing Sheets

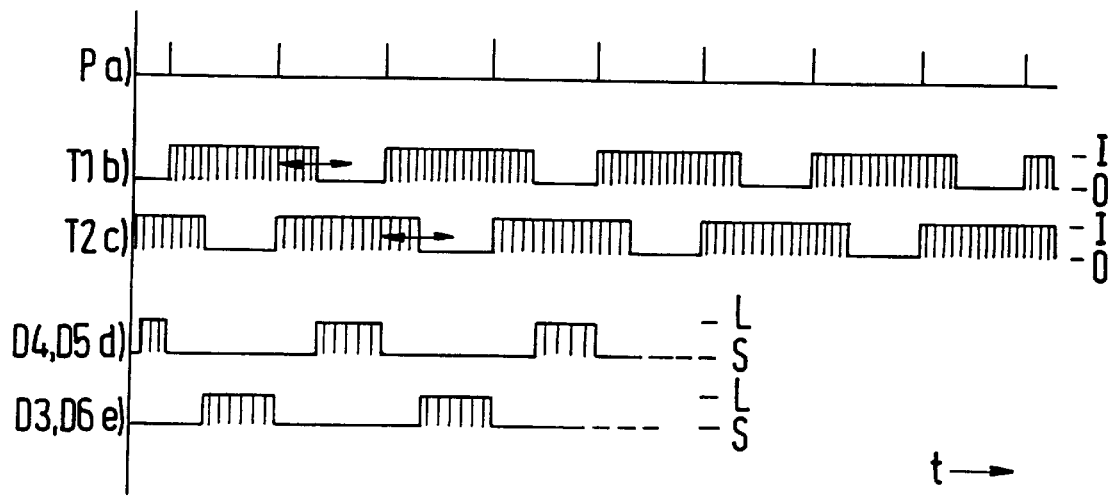
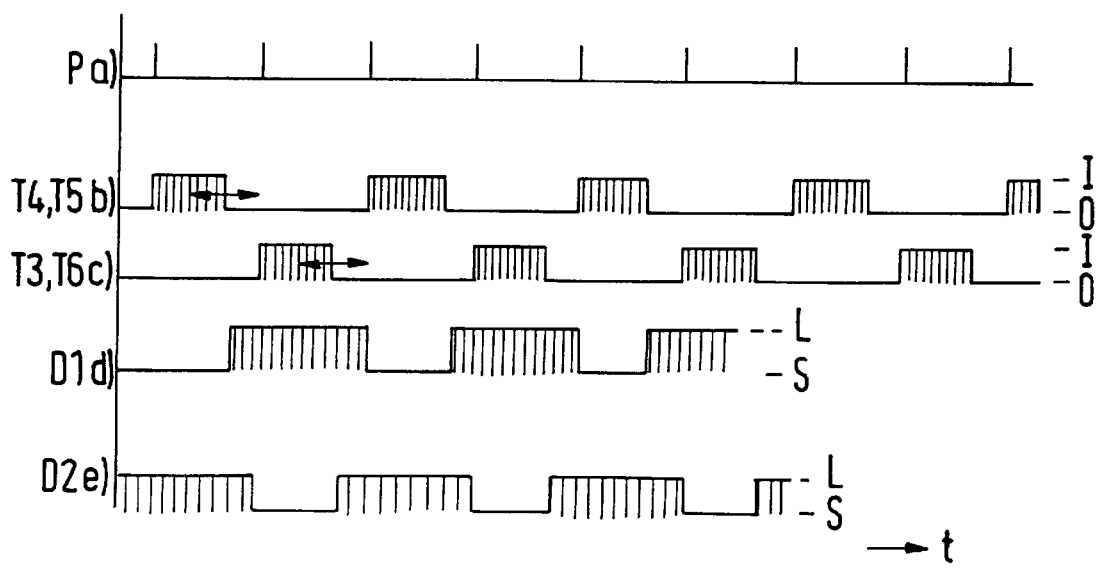

BIDIRECTIONAL DC/DC CONVERTER WITH A STEP-UP MODE IN ONE DIRECTION AND A STEP-DOWN MODE IN THE OTHER DIRECTION

BACKGROUND OF THE INVENTION

FIELD OF THE INVENTION

The invention relates to a DC/DC converter with bi-directional energy flow.

Such converters can be used for example in motor vehicle technology for the purpose of transferring energy between a starter battery and a fuel cell system.

In the case of an electric vehicle drive fed by fuel cells, the starting operation may necessitate the provision of auxiliary energy with a DC voltage of more than 200 V and a power of approximately 2 kW. Using a step-up converter, the required auxiliary energy can be drawn e.g. from a 12 V starter battery during the starting operation. The starter battery can be subsequently recharged using a step-down converter by the electrical energy that can be supplied by the fuel cell battery with a DC voltage of 250 V, for example.

The use of both a step-up converter and, in addition, of a step-down converter in such an application signifies a considerable outlay.

A DC/DC converter that operates as a step-up converter in a first direction of energy flow and alternately as a step-down converter in the opposite direction is therefore desirable. At the same time, it is necessary to provide DC decoupling of the electric circuits to be connected by the DC/DC converter.

In many applications, particularly in motor vehicle technology, DC/DC converters that operate only as step-down converters but likewise have potential isolation are also required. Such unidirectional DC/DC step-down converters as well as the above-mentioned bi-directional DC/DC converter should be able to be realized particularly compactly in a manner that saves both materials and costs.

One approach to realizing particularly compact converters is provided by Published, Non-Prosecuted German Patent Application DE 195 42 357 A1. A magnetic compound unit and a number of converter circuits can be found therein. The magnetic compound unit can be used to realize converter circuits in which the function of an energy storage inductor with a center tap can be combined together with the function of a potential-isolating transformer in a single inductive component. Various embodiments of the magnetic compound unit are specified in FIGS. 7, 8 and 8a of the Published, Non-Prosecuted German Patent Application DE 195 42 357 A1.

An AC/DC converter circuit which operates as a step-up converter is specified in FIG. 6 of the Published, Non-Prosecuted German Patent Application DE 195 42 357 A1. Although this circuit can be changed into a DC/DC step-up converter in a straightforward manner by omitting the rectifier bridge on the input side, it operates only in one direction of energy flow.

FIG. 11 of the Published, Non-Prosecuted German Patent Application DE 195 42 357 A1 shows a further AC/DC converter circuit, which, depending on the driving, can operate as a step-up or step-down converter, although only ever in one direction of energy flow. This circuit could be embodied as a DC/DC step-down converter in a straightforward manner by omitting the rectifier bridge on the input side. However, the converter has a non-continuous HF output current in the stepping down mode on the output side downstream of the rectification, the AC component of which output current stresses the output capacitor. Therefore, although this configuration is suitable for large output powers, it is not suitable for large output currents.

SUMMARY OF THE INVENTION

It is accordingly an object of the invention to provide a DC/DC converter which overcomes the above-mentioned disadvantages of the prior art devices of this general type, in which a potential-isolated, bi-directionally operable DC/DC converter and also a potential-isolated DC/DC step-down converter are in each case disclosed and intended to be realized with a particularly low cost and outlay.

With the foregoing and other objects in view there is provided, in accordance with the invention, a DC/DC converter acting alternately as a step-up converter in a first direction of energy flow and as a step-down converter in a second direction of the energy flow, including:

a magnetic compound unit having an iron core with an air gap-free limb, an air gap-containing magnetic circuit for realizing an energy store function, and an air gap-free magnetic circuit for realizing a transformer function disposed parallel to the air gap-containing magnetic circuit, the magnetic compound unit further having two series-connected low-voltage windings with a junction point therebetween routed out as a center tap and two series-connected high-voltage windings, a respective low-voltage winding of the two series-connected low-voltage windings disposed together with one of the series-connected high-voltage windings on the air gap-free limb of the iron core;

a first switch circuit connected to the two series-connected low-voltage windings;

a first rectifier circuit connected to the two series-connected high-voltage windings;

a first smoothing circuit connected to the first rectifier circuit;

a controller connected to the first rectifier circuit and the two series-connected low-voltage windings;

the controller, the first switching circuit, the first rectifier circuit and the first smoothing circuit defining step-up converter components for performing step-up converter operations;

a second switching circuit connected to the first rectifier circuit;

a second rectifier circuit connected to the two series-connected low-voltage windings;

a second smoothing circuit connected to the two series-connected low-voltage windings;

the second switching circuit, the second rectifier circuit, the second smoothing circuit and the controller defining step-down converter components for performing step-down converter operations; and an energy flow circuit for controlling a direction of energy flow.

The circuit according to the invention in conjunction with the magnetic compound unit, which can also be embodied in a flat configuration, makes it possible to produce particularly compact converters.

Other features which are considered as characteristic for the invention are set forth in the appended claims.

Although the invention is illustrated and described herein as embodied in a DC/DC converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

SUMMARY OF THE INVENTION

FIG. 2 is a chart showing current characteristics in a step-up converter mode;

FIG. 3 is a chart showing the current characteristics in a step-down converter mode;

Figure 4:
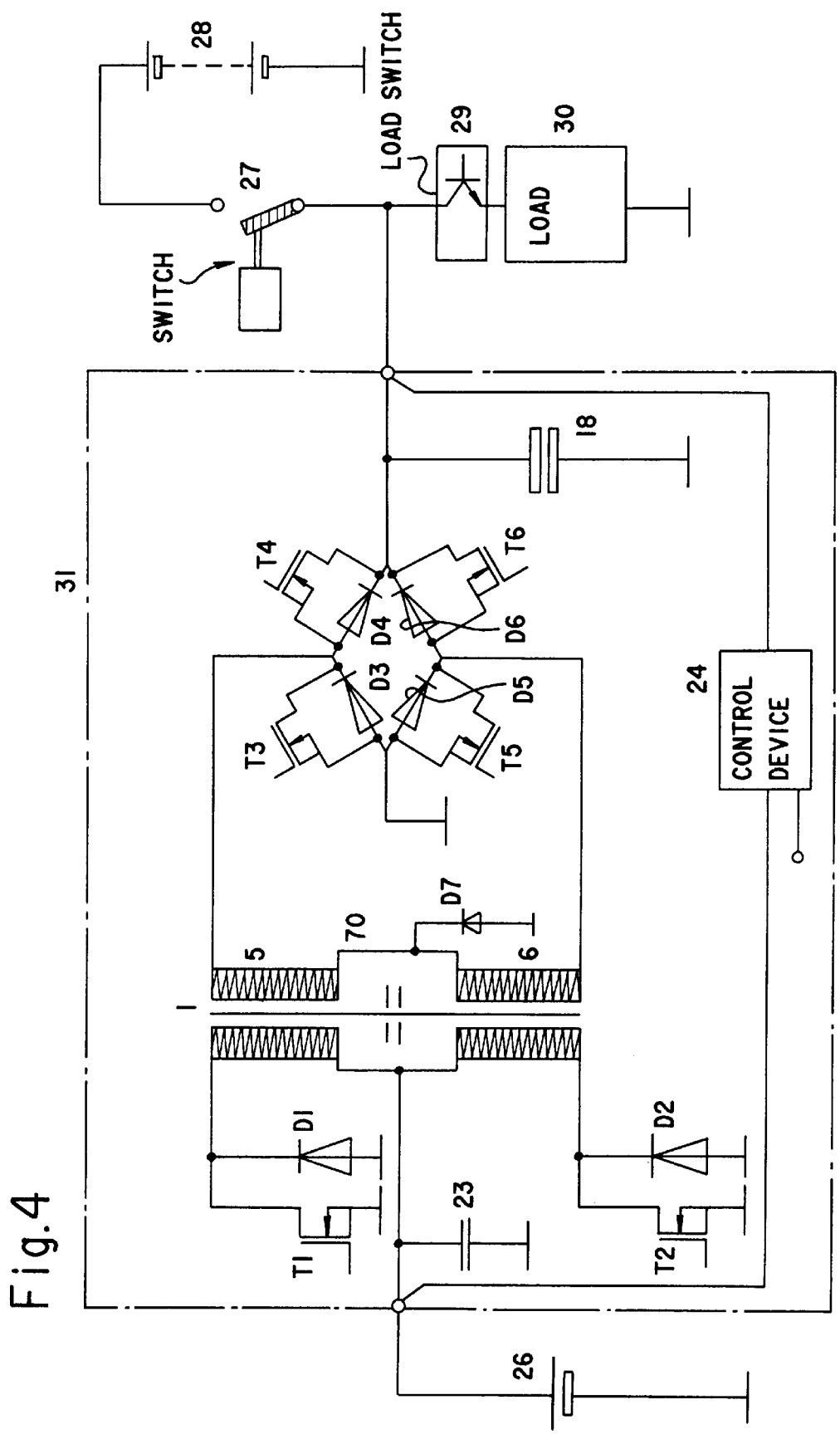
Figure 5:
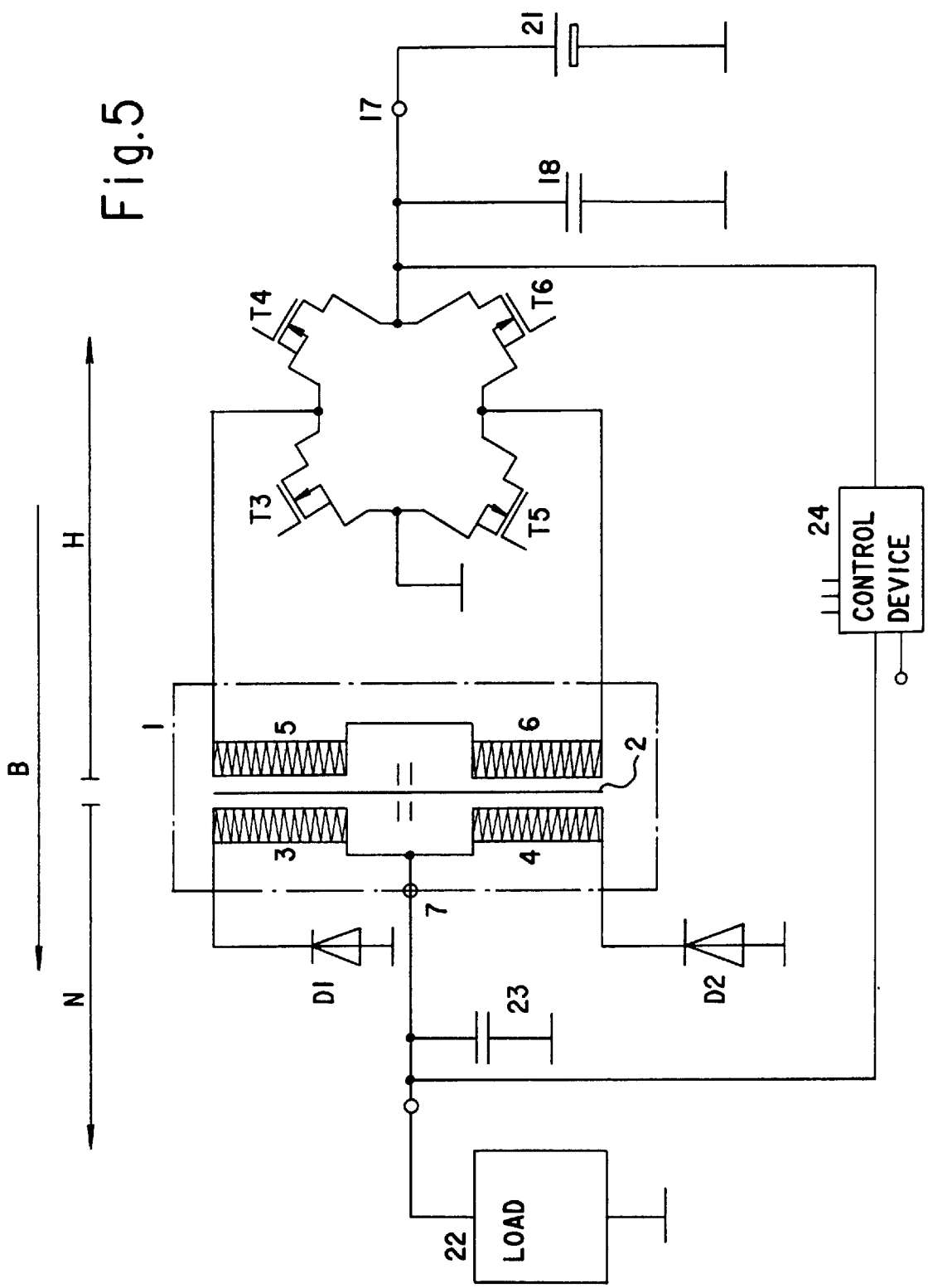
Figure 6:
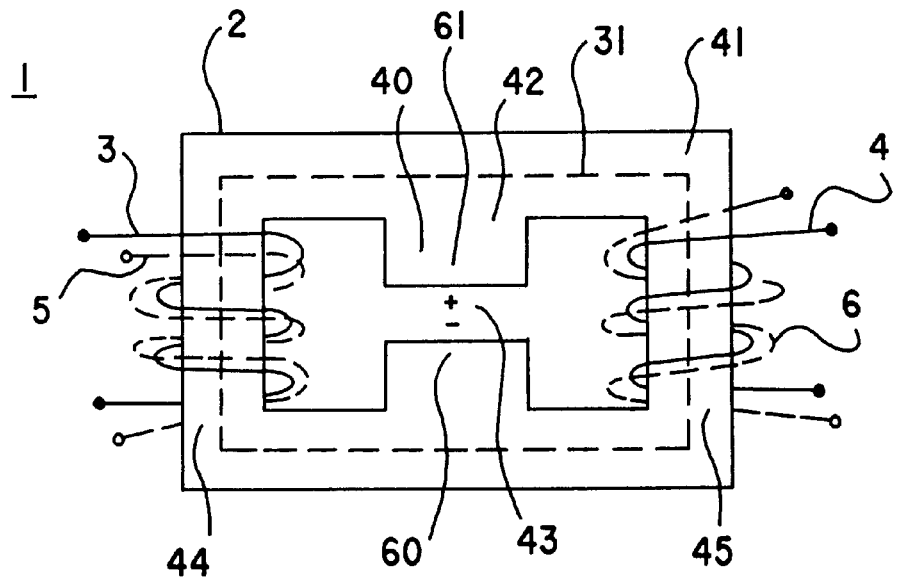
Figure 7:
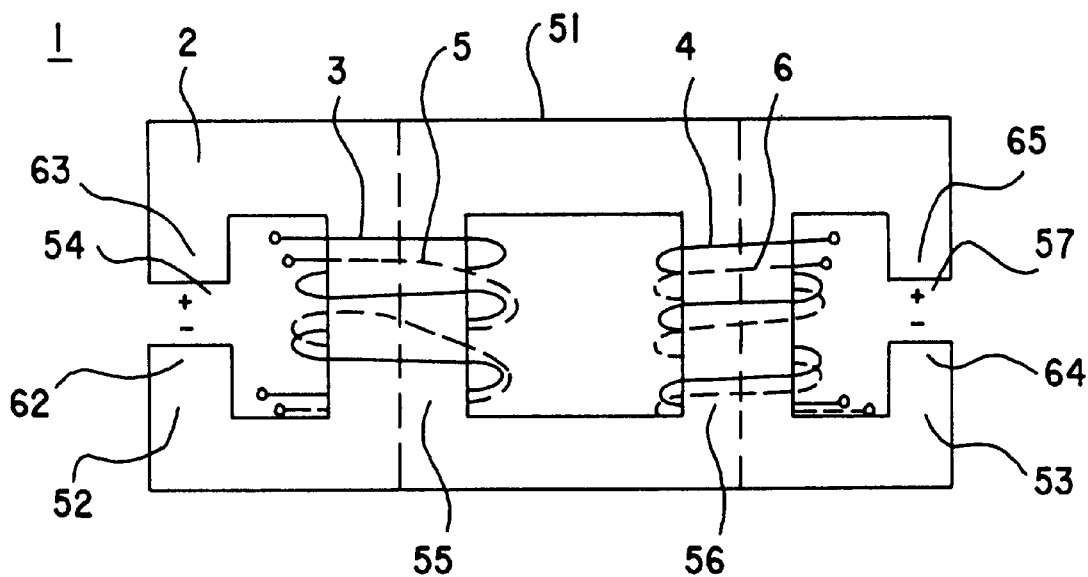

FIG. 4 a block circuit diagram in the case where the DC/DC converter is used in an electric vehicle with a fuel cell battery;

FIG. 5 is a block circuit diagram of a step-down converter;

FIG. 6 a front-elevational view a first embodiment variant of a magnetic compound unit; and FIG. 7 is a front-elevational view of a second embodiment variant of the magnetic compound unit.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a DC/DC converter with a magnetic compound unit 1 that has a first and a second low-voltage winding 3, 4 and also a first and a second high-voltage winding 5, 6 on an iron core 2. A low-voltage side of the circuit configuration is designated by N and a high-voltage side by H. The low-voltage windings 3, 4 are electrically connected in series, a junction point of the low-voltage windings 3, 4 being routed out as a center tap 7. On the high-voltage side, the windings 5, 6 are likewise connected in series, but without a junction point being routed out.

In order to form a step-up converter with push-pull operation, outer terminals 8, 9 of the low-voltage windings 3, 4 can each be connected to a first pole 10 of a low-voltage energy source 11 via power transistors T1, T2. The center tap 7 can be connected to a second pole 12 of the low-voltage voltage source 11 via a first changeover switch 13, in position a thereof. The terminals 14, 15 of the high-voltage windings 5, 6 are connected to a full-bridge circuit 16 containing rectifier diodes D3, D4, D5, D6. A smoothing capacitor 18 is connected in parallel with a DC voltage terminal 17 of the full-bridge circuit 16. In a step-up converter mode, a load 20 on the high-voltage side can be connected to the DC voltage terminal 17 via a second changeover switch 19, in position a thereof.

In order to enable an additional step-down converter function, respective transistors T3, T6 are connected in parallel with diodes D3 to D6 in the full-bridge circuit 16 on the high-voltage side. For the purpose of forming a second push-pull converter function, electrical energy being fed in from a high-voltage energy source 21 via the second changeover switch 19, in position b thereof. On the low-voltage side respective diodes D1, D2 are connected in parallel with the transistors T1, T2 for the step-down converter mode. Schottky diodes are particularly suitable for the diodes. In the step-down converter mode, the center tap 7 is connected to a load 22 on the low-voltage side by the first changeover switch 13, in position b thereof. A capacitor 23, which is disposed on the low-voltage side N and is connected between the center tap 7 and earth, is provided for taking up higher-frequency alternating currents. It should consequently effect a constant load voltage. If the load, for example a battery, itself is able to perform this task, the capacitor 23 can be omitted. The voltages on the high and low-voltage sides and also control signals are in each case fed to a control device 24 via a control input 25. The control device 24 effects switching over of the changeover switches 13, 19 and also the driving of the transistors T1 to T6. The direction of energy flow in the step-up converter mode is designated by A, and the direction of energy flow in the step-down converter mode is designated by B.

In order to explain the method of operation of the bi-directional converter, FIG. 2 shows associated current characteristics in the step-up mode and FIG. 3 shows current characteristics in the step-down mode.

In FIG. 2, clock pulses P are illustrated in row a and associated on states I and off states O of the transistor T1 in the course of time t are illustrated in row b, the states being variable in respect of their duration. Row c shows the corresponding switched-on durations of the second transistor T2. Row d shows the associated duration of the conducting states L and blocking states S of the diodes D4, D5, and row e of the diodes D3, D6.

FIG. 2 reveals that, in the step-up converter mode, the on times of the transistors T1, T2 overlap in push-pull operation. As is evident from FIG. 3, by contrast, the on times of the transistors T4 and T5 do not overlap with the on times of the transistors T3 and T6. FIG. 3 shows, in a similar manner to FIG. 2 the clock pulses P in row a, the controllable switched-on durations of the transistors T4, T5 and T3, T6 in rows b and c, respectively, and the associated conducting phases of the diodes D1 and D2 in rows d and e.

Figure 1:
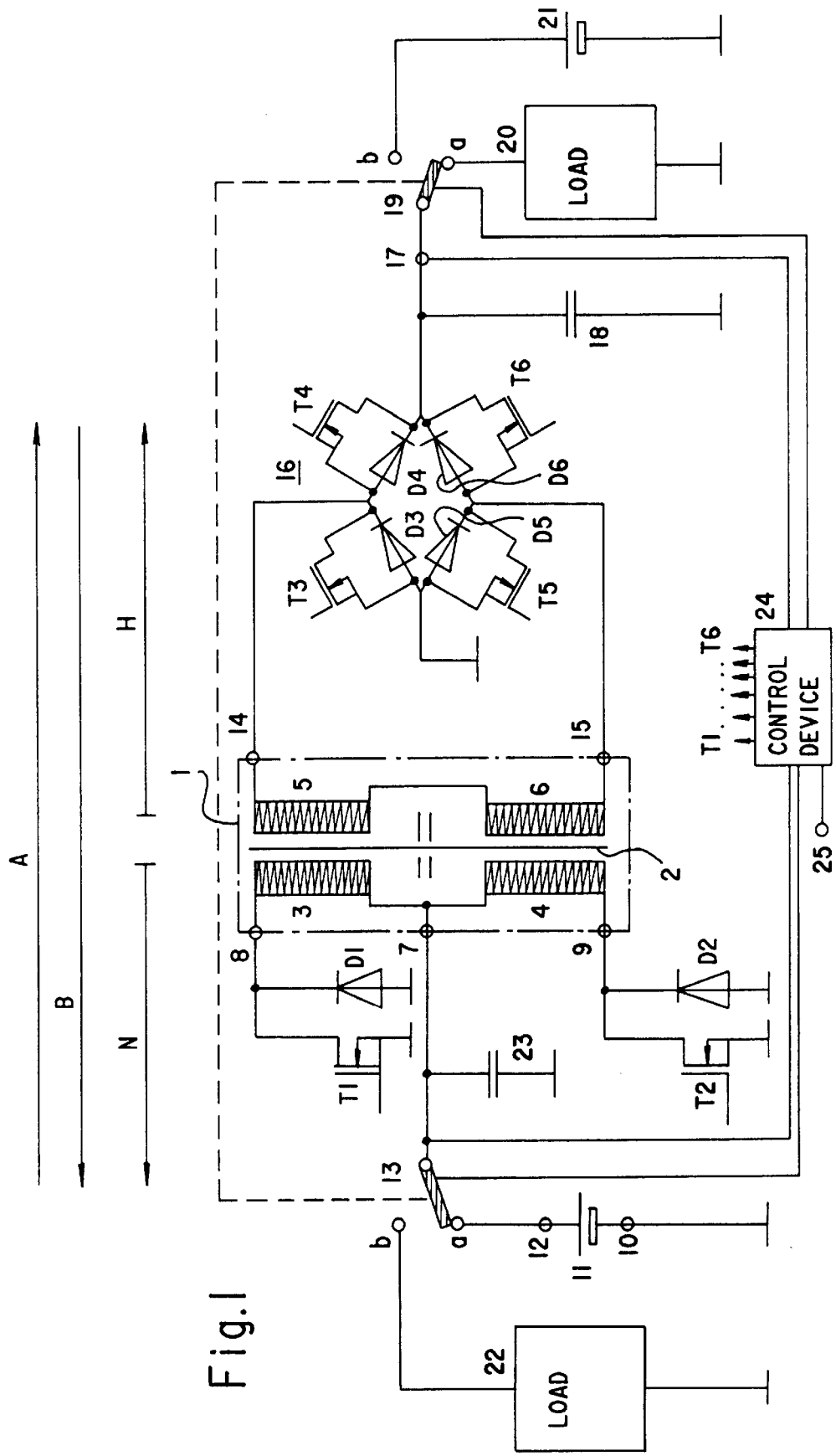
FIG. 1 is a diagrammatic, circuit diagram of a bi-directional DC/DC converter according to the invention.

While FIG. 1 shows a generally applicable illustration of the bi-directional DC/DC converter with possibilities on the high and/or low-voltage sides for switching over between loads and energy sources, FIG. 4 illustrates the bi-directional DC/DC converter in an application in which the converter is used in an electric vehicle with fuel cell feeding. A fuel cell that requires an auxiliary energy for the starting operation is assumed in this case. A starter battery 26, e.g. a 12 V battery, is present on the low-voltage side in this special case, which battery 26 acts as an energy source in the step-up mode and as a load in the step-down mode. The changeover switch 13 on the low-voltage side (FIG. 1) is therefore obviated. The changeover switch 19 on the high-voltage side (FIG. 1) is also obviated. Instead, a switch 27 is present in the configuration in accordance with FIG. 4, with the aid of which switch a fuel cell battery 28 can be connected to the DC/DC converter 31. The fuel cell battery 28 acts as a load in the step-up mode and as an energy source in the step-down mode. Therefore, the starter battery 26 can be recharged after the starting of the fuel cell battery 28. The fuel cell battery 28 operates in a voltage range of 190 to 320 volts, for example. As a main load, a vehicle drive 30 can be connected to the fuel cell battery 28 by a load switch 29.

In the case of the configuration in accordance with FIG. 4, a changeover between the step-up converter and the step-down converter operation is effected solely by corresponding driving of the transistors T1 to T6 by the control device 24 of the converter 31.

In FIG. 4, as a possible refinement of the invention, with dashed lines, a diode D7 is connected between a junction point of the high-voltage windings 5, 6 and earth, which thus constitutes a semi-conducting connection to the negative pole of the high-voltage side. This enables a start-up mode in which, while no load (28, 30) is yet connected, the smoothing capacitor 18 is charged with a small converter power to an operating voltage level. A method of driving the transistors T1, T2 which is suitable for the start-up mode is described in Published, Non-Prosecuted German Patent Application DE 195 42 357 A1 as a method of operation of the circuit illustrated in FIG. 11 therein.

FIG. 5 shows one possible embodiment of the converter in an application in which only a step-down converter function is required. The components that are then required in the circuit configuration are designated by the same reference symbols as the components of the configuration in accordance with FIG. 1, thereby rendering repetition of the description unnecessary.

The converter behaves like the known push-pull flux converter but can be realized with a smaller outlay on components.

Each of the magnetic compound units described in the application DE 195 42 357 A1 and illustrated in drawing figures can advantageously be used in the converter configuration illustrated in FIGS. 1, 4 and 5.

Two of the known magnetic compound units are illustrated in FIGS. 6 and 7.

FIG. 6 shows the magnetic compound unit 1 having a three-limb core 41 as the iron core 2, a middle limb 42 of which has an air gap 43 and outer limbs 44, 45 of which respectively carry the low-voltage winding 3 and 4 and the high-voltage winding 5 and 6. An air gap-containing magnetic circuit 40 with a permanent magnetic bias voltage is formed by a permanent magnet 60, 61 in a region of the air gap 43 and an air gap-free magnetic circuit 31 is illustrated by a dashed line.

FIG. 7 shows an embodiment variant of the magnetic compound unit 1 having a four-limb core 51. Outer limbs 52, 53 are each provided with respective air gaps 54, 57. Permanent magnets 62, 63 and 64, 65 in the magnetic compound unit 1 of FIG. 7 are configured in the same way as the permanent magnet 60, 61 shown in FIG. 6. Inner limbs 55, 56 respectively carry a low-voltage winding 3 and 4 and high-voltage winding 5 and 6.

We claim:

1. A DC/DC converter acting alternately as a step-up converter in a first direction of energy flow and as a step-down converter in a second direction of the energy flow, comprising:

a magnetic compound unit having an iron core with an air gap-free limb, an air gap-containing magnetic circuit for realizing an energy store function, and an air gap-free magnetic circuit for realizing a transformer function disposed parallel to said air gap-containing magnetic circuit, said magnetic compound unit further having two series-connected low-voltage windings with a junction point there-between routed out as a center tap and two series-connected high-voltage windings, a respective low-voltage winding of said two series-connected low-voltage windings disposed together with one of said series-connected high-voltage windings on said air gap-free limb of said iron core;

a first switch circuit connected to said two series-connected low-voltage windings;

a first rectifier circuit connected to said two series-connected high-voltage windings;

a first smoothing circuit connected to said first rectifier circuit;

a controller connected to said first rectifier circuit and said two series-connected low-voltage windings;

said controller, said first switching circuit, said first rectifier circuit and said first smoothing circuit defining step-up converter components for performing step-up converter operations;

a second switching circuit connected to said first rectifier circuit;

a second rectifier circuit connected to said two series-connected low-voltage windings;

a second smoothing circuit connected to said two series-connected low-voltage windings;

said second switching circuit, said second rectifier circuit, said second smoothing circuit and said controller defining step-down converter components for performing step-down converter operations; and an energy flow circuit for controlling a direction of energy flow.

2. The DC/DC converter according to claim 1, wherein said iron core is a three-limb core having a middle limb with an air gap formed therein and two outer limbs carrying said series-connected low-voltage windings and said series-connected high-voltage windings.

3. The DC/DC converter according claim 2, including at least one permanent magnet disposed in said iron core, and said air gap-containing magnetic circuit has a permanent-magnetic bias voltage produced by said at least one permanent magnet.

4. The DC/DC converter according to claim 1, wherein said iron core is a four-limb core having outer limbs each with an air gap formed therein and inner limbs carrying said two series-connected low-voltage windings and said series-connected high-voltage windings.

5. The DC/DC converter according to claim 1, wherein said first switching circuit and said second switching circuit contain power transistors.

6. The DC/DC converter according to claim 1, wherein said first rectifier circuit and said second rectifier contain semiconductor diodes.

7. The DC/DC converter according to claim 6, wherein said semiconductor diodes are Schottky diodes.

8. The DC/DC converter according to claim 1, wherein said first smoothing circuit and said second smoothing circuit each contain a capacitor.

9. The DC/DC converter according to claim 1, wherein said energy flow circuit includes switches controlled by said controller, said controller controlling a state of said switches for controlling the direction of the energy flow.

10. The DC/DC converter according to claim 1, wherein said step-up converter operations and said step-down converter operations function in accordance with a push-pull converter principle, said first rectifier circuit formed of diodes and said second switching circuit formed of power transistors each respectively connected in parallel with one of said diodes of said first rectifier circuit for forming a diode full-bridge on a high voltage side.

11. The DC/DC converter according to claim 1, including:

an energy source having a negative pole for supplying energy; and a further diode having an anode and a cathode connected to a junction point between said two series-connected high-voltage windings, said anode of said further diode connected to said negative pole of said energy source.

12. A DC/DC step-down converter, comprising:

a magnetic compound unit having an iron core, a low-voltage side and a high-voltage side, said iron core having an air gap-free limb, an air gap-containing magnetic circuit for realizing an energy store function, and an air gap-free magnetic circuit for realizing a transformer function and disposed parallel to said air gap-containing magnetic circuit, said magnetic compound unit further having two series-connected low-voltage windings with a junction point, there-between routed out as a center tap and two series-connected high-voltage windings, a respective low-voltage winding of said two series-connected low-voltage windings disposed together with one of said series-connected high-voltage windings on said air gap-free limb of said iron core;

a power transistor full-bridge disposed on said high-voltage side of said magnetic compound unit;

rectifier diodes disposed on said low-voltage side of said magnetic compound unit;

a capacitor disposed on said low-voltage side of said magnetic compound unit; and a controller driving said power transistor full-bridge in a push-pull operation.

* * * * *